(12) United States Patent
Kitahara

(10) Patent No.: US 7,095,582 B2
(45) Date of Patent: Aug. 22, 2006

(54) MAGNETIC TAPE DRIVE

(75) Inventor: Toshiyuki Kitahara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 133 days.

(21) Appl. No.: 10/688,931

(22) Filed: Oct. 21, 2003

(65) Prior Publication Data

US 2004/0223252 A1 Nov. 11, 2004

(30) Foreign Application Priority Data

Oct. 23, 2002 (JP) ............................. 2002-308391

(51) Int. Cl.
*G11B 5/584* (2006.01)
(52) U.S. Cl. .................... 360/77.12; 360/76; 360/121
(58) Field of Classification Search ................ 360/76, 360/77.12, 48
See application file for complete search history.

(56) References Cited

U.S. PATENT DOCUMENTS

| 4,055,849 | A | * | 10/1977 | Hickok ................. 360/77.13 |
| 4,819,092 | A | * | 4/1989 | Richards ................. 360/27 |
| 5,285,331 | A | * | 2/1994 | White ................. 360/77.12 |
| 5,452,165 | A | * | 9/1995 | Chen et al. ............... 360/121 |
| 5,555,142 | A | * | 9/1996 | Komai et al. ............ 360/77.06 |
| 5,982,711 | A | * | 11/1999 | Knowles et al. ......... 360/77.12 |
| 6,094,806 | A | * | 8/2000 | McNeil et al. ............ 29/603.14 |
| 6,130,804 | A | * | 10/2000 | Panish et al. ............ 360/241.1 |
| 6,169,640 | B1 | * | 1/2001 | Fasen ..................... 360/48 |
| 6,222,698 | B1 | * | 4/2001 | Barndt et al. .............. 360/76 |

FOREIGN PATENT DOCUMENTS

| JP | 08-30942 A | 2/1996 |
| JP | 08-227511 A | 9/1996 |

* cited by examiner

*Primary Examiner*—Kin Wong
(74) *Attorney, Agent, or Firm*—Sughrue Mion, PLLC

(57) ABSTRACT

A magnetic tape drive has a servo head for performing the tracking control and a head unit. The head unit includes a recording head group composed of a plurality of recording heads, which are lined up along the width directions with respect to a magnetic tape. In this head unit, the distance between the recording heads is the same distance as the distance between adjacent data tracks to be formed on the magnetic tape, and the azimuth angle of each recording heads differs with each other. A plurality of data tracks are simultaneously formed on the magnetic tape using a plurality of recording heads, respectively, when performing the recording of data on the magnetic tape.

14 Claims, 8 Drawing Sheets

MAGNETIC TAPE DRIVE

BACKGROUND OF THE INVENTION

1. Field of the Invention

The present invention relates to a magnetic tape drive that can provide data tracks along the width directions of the magnetic tape in the high density. Preferably, the present invention relates to a magnetic tape drive, which can provide more data tracks along the width directions of the magnetic tape.

2. Description of Relevant Art

In recent years, a high-density recording technique to be applied to a magnetic tape has been developed rapidly, and thus a magnetic tape whose recording capacity is more than 100 G bytes has been brought to the market. In these conventional magnetic tapes, the width of the data track and the interval between data tracks have been made narrow gradually in order to increase the number of data tracks, when providing data tracks on the magnetic tape.

In the conventional magnetic tape drive that performs the recording and reproducing of data to the above described magnetic tape, a head unit, which has a plurality of data signal recording heads (hereinafter indicated as "recording head") and data signal reproducing heads (hereinafter indicated as "reproducing head"), is installed.

In this head unit, the recording (reproducing) of data on the adjacent data track is performed by the same recording head. Thus, the recording (reproducing) of data is performed by changing the data track in due order. To be more precise, when the recording (reproducing) of data by the recording head (reproducing head) is performed from one end to the other end of the data track, the position in the width direction of the head unit is shifted to just above the adjacent data track. Then, the recording (reproducing) of data by the recording head (reproducing head) is performed from the other end to one end. By repeating this motion of the recording head (reproducing head) for several times, the recording (reproducing) of data on (from) the magnetic tape is achieved.

In the conventional magnetic tape drive, therefore, a tracking servo technique that controls the position in the width directions of the head unit is adopted.

Here, the tracking servo technique is a technique that allows the head unit to track the data track. In other words, this is a technique that allows the head unit to move along the data track with accuracy. In this case, the tracking of the head unit is performed by controlling the position of the head unit along the width directions with respect to the magnetic tape using an actuator, which is operated based on the servo signal obtained by the readout of the servo signal from the magnetic tape. Here, servo signal is a signal previously recorded on the magnetic tape and is obtained using a servo signal readout head.

As examples of the tracking servo technique, a technique disclosed in Japanese unexamined patent publication H08-227511 and a technique disclosed in Japanese unexamined patent publication H08-30942 can be cited. In H08-227511, an amplitude servo method, in which servo burst patterns as a servo signal that are lined up in two lines along traveling directions of the magnetic tape are used, is disclosed. In H08-30942, a timing based servo method, in which timing based signals as a servo signal that are recorded on the magnetic tape are used, is disclosed.

In the conventional magnetic tape drive, the recording head is shifted to the next position, from which new data track is provided along the longitudinal directions of the magnetic tape, when the provision of one data track by the recording head is terminated.

In the conventional magnetic tape drive, therefore, a margin having a predetermined width is provided between adjacent data tracks so that the newly provided data track will not contact the data track provided before.

In the conventional magnetic tape drive, additionally, various kinds of efforts that is used for improving the accuracy of the tracking servo technique has been attempted in order to line up data tracks along the width directions of the magnetic tape at a short margin (interval).

As reasons described above, the magnetic tape drive that can provide data tracks along the width directions of the magnetic tape at short interval has been required.

SUMMARY OF THE INVENTION

The present invention relates to a magnetic tape drive including a head unit, which has a plurality of recording heads for recording data on a magnetic tape, and a servo head for performing a readout of a servo signal recorded on the magnetic tape in order to achieve a tracking control of the head unit. In this apparatus, recording heads are lined up along the width directions with respect to the magnetic tape, and the distance between adjacent recording heads is the same as the distance between adjacent data tracks to be formed on the magnetic tape by respective recording heads. In this apparatus, additionally, azimuth angles of adjacent recording heads differ with each other, and a plurality of data tracks are simultaneously formed on the magnetic tape by respective recording heads, when performing the recording of data on the magnetic tape.

According to the present invention, a plurality of data tracks is simultaneously formed on the magnetic tape by a plurality of recording heads. In this occasion, since the distance between adjacent recording heads is the same as the distance between adjacent data tracks to be formed on the magnetic tape, a wide margin space, which is provided in order to allow for error, such as a control error of the head unit, is not required between adjacent data tracks of the magnetic tape. Thus, the magnetic tape, in which data tracks are formed in more dense state than the conventional magnetic tape, can be provided.

In this magnetic tape drive, the azimuth angles of adjacent recording heads differ with each other. Thus, an adjacent data track is formed by a different azimuth angle, respectively.

Therefore, when performing the reproducing of data, each reproducing head can reproduce the prescribed data without reproducing the data held in the adjacent data track. This is because if the azimuth angle of the reproducing head disagrees with the azimuth angle of the data track, the reproducing head can not read data from the data track.

Thereby, since the distance between data tracks can be set to almost zero, the magnetic tape MT, in which data tracks are formed in more dense state than the conventional magnetic tape MT, can be provided.

In this magnetic tape drive, preferably, the head unit has a plurality of reproducing heads for performing the readout of data written by recording heads from the magnetic tape. In this case, it is preferable that reproducing heads are provided in a one-to-one relationship with corresponding recording heads, and that the azimuth angle of each reproducing heads is the same as that of corresponding recording head.

Additionally, it is preferable that the width of the reproducing head is longer than the width of the recording head.

In this magnetic tape drive, still more preferably, it is preferable that the reproducing head has spare reproducing heads at both sides in the width directions with respect to the magnetic tape, and the length and azimuth angle of the spare reproducing head are the same as that of the reproducing head.

DETAILED DESCRIPTION OF THE PREFERRED EMBODIMENT

The preferred embodiment of the present invention will be explained with reference to the attached drawings.

In the present embodiment, the magnetic tape, which has 5 servo tracks, and in which a total of 96 data tracks are provided per data band that is formed between servo tracks, will be explained as an example.

In the following explanations, the term "the width of the head" means that the width with respect to the width directions of the head gap. The term "azimuth angle" means that the intersection angles between the width directions axis of the magnetic tape and the longitudinal axis of the head. In other words, the term "azimuth angle" is an intersection angle with respect to the width directions axis of the magnetic tape of the head.

Magnetic Tape

Firstly, a magnetic tape used in the magnetic drive according to the present invention will be explained with reference to FIG. 1A and FIG. 1B.

Figure 1A:
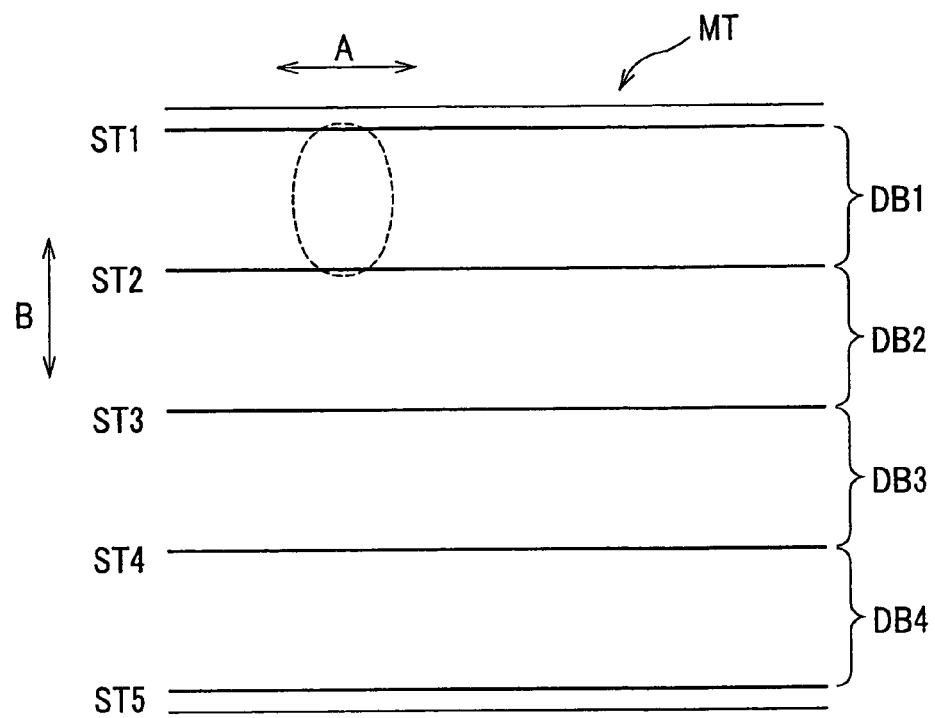
FIG. 1A is a plane view showing the part of the magnetic tape MT.

In FIG. 1A, servo tracks ST1–ST5, which are provided on the magnetic tape MT, and data bands DB1–DB4, which are provided between servo tracks, are schematically indicated.

Figure 1B:
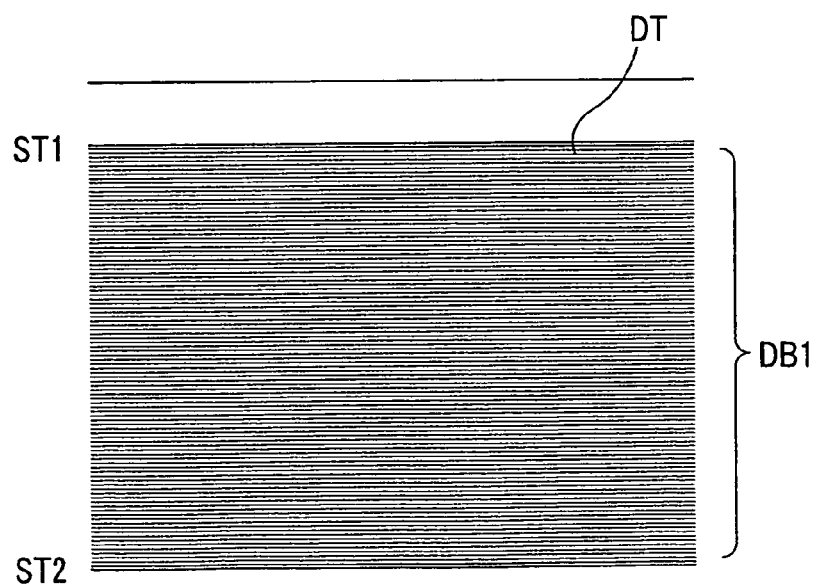
FIG. 1B is an enlarged plane view showing the part of the magnetic tape MT enclosed in the circle shown by dot dash line of FIG. 1A.

In FIG. 1B, part of the magnetic tape MT that is enclosed in the circle shown by dot dash line of FIG. 1A is indicated.

A magnetic tape MT shown in FIG. 1A is a magnetic tape to be used for storing backup data. This magnetic tape MT is compliant with the LTO (liner tape open) standards and has a ½ inch-width.

In this magnetic tape MT, a total of 5 servo tracks ST1–ST5 written by a servo writer (not shown) are provided along the longitudinal directions A of the magnetic tape MT. These servo tracks ST1–ST5 are lined up in the width directions B of the magnetic tape MT at regular intervals.

The region between adjacent servo tracks ST serves as a band (a data band DB), onto which data (data signal) is recorded by the magnetic tape drive 10 (see FIG. 1A). In the magnetic tape MT shown in FIG. 1A, since a total of 5 servo tracks are provided, a total of 4 data bands DB1–DB4 are provided.

In these data bands DB1–DB4, as shown in FIG. 1B, a plurality of data tracks is written at a regular interval by the magnetic tape drive 10 so that each of the data tracks becomes parallel to the servo track ST.

Magnetic Tape Drive

Next, the construction of the magnetic tape drive 10 will be explained with reference to FIG. 2.

Figure 2:
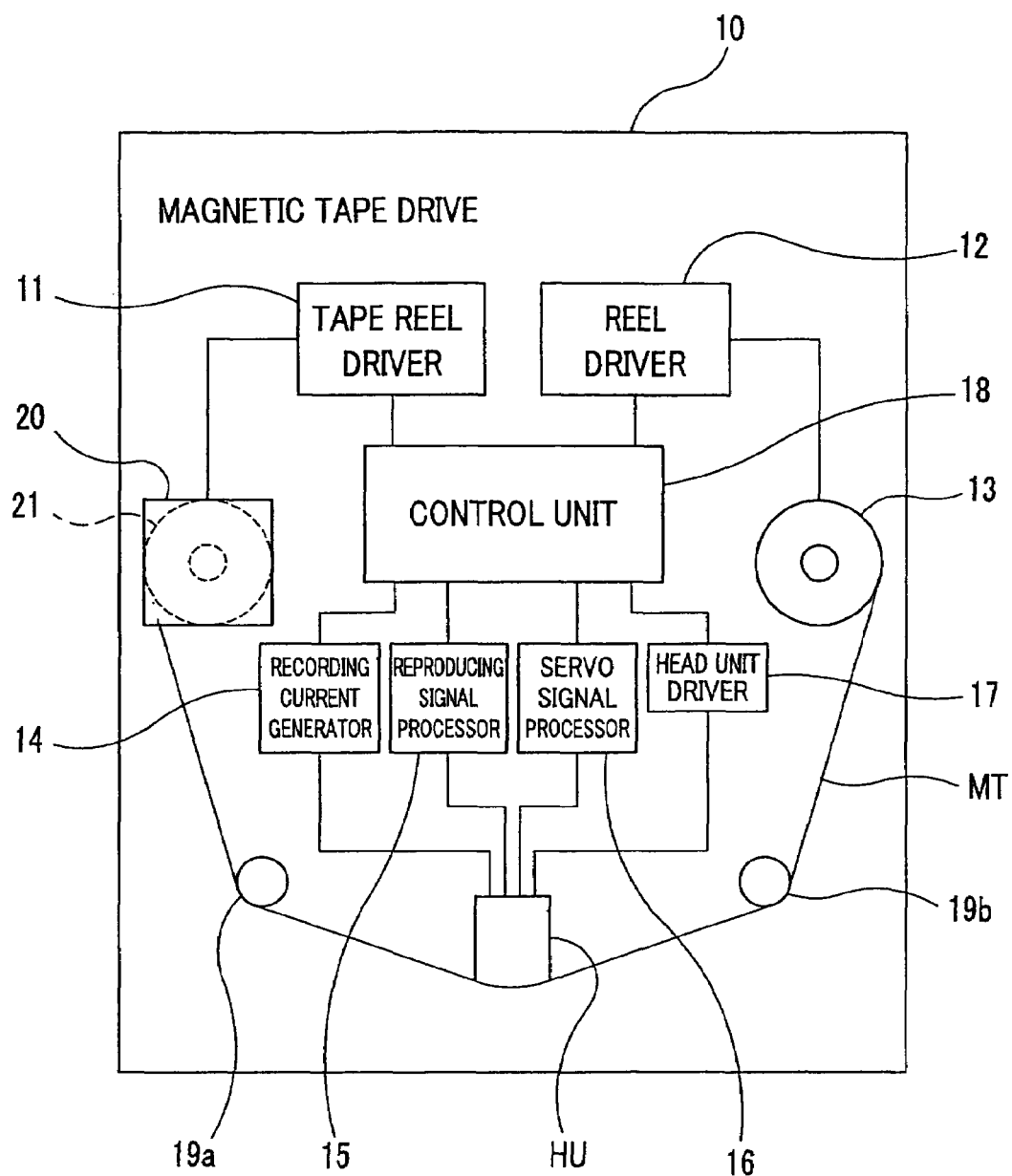
FIG. 2 is a schematic view of the magnetic tape drive 10 according the present invention.

FIG. 2 is a schematic view of the magnetic tape drive 10 according to the present invention.

The magnetic tape drive 10 is connected to a computer (not shown), and performs the recording and reproducing of data to the magnetic tape MT. To be more precise, the magnetic tape drive 10 records the data entered from the computer on the magnetic tape MT based on the command from the computer when performing the reproducing. In this occasion, data is recorded on the magnetic tape as a data signal.

The magnetic tape drive 10, on the other hand, obtains the data (data signal) recorded on the magnetic tape MT based on the command from the computer for performing the reproducing.

As shown in FIG. 2, the magnetic tape drive 10 is mainly composed of a tape reel driver 11, a reel driver 12, a reel 13, a head unit HU, a recording current generator 14, a reproducing signal processor 15, a servo signal processor 16, a head unit driver 17, and a control unit 18.

In this magnetic tape drive 10, a magnetic tape manager (not shown) and a pullout device (not shown) are provided. Here, the magnetic tape manager is a device that loads the magnetic tape cartridge 20 into the magnetic tape drive 10 and ejects the magnetic tape cartridge 20 from the magnetic tape drive 10. The pullout device is a device that performs the pullout of the magnetic tape MT from the magnetic tape cartridge 20.

In this magnetic tape drive 10, therefore, a leading edge of the magnetic tape MT is pulled out by the pullout device when the magnetic tape cartridge 20 is loaded to the magnetic tape drive 10. Then, the leading edge of the magnetic tape MT pulled out from the magnetic tape cartridge 20 is connected to a hub of the reel 13.

Next, each components of the magnetic tape drive 10 will be explained.

Tape Reel Driver 11 and Reel Driver 21

The tape reel driver 11 rotates the tape reel 21 stored in the magnetic tape cartridge 20. The reel driver 12 rotates the reel 13. In this magnetic tape drive 10, the magnetic tape MT travels in compliance with the rotation of the tape reel 21 and the reel 13, which are driven by the tape reel driver 11 and the reel driver 12, respectively, when the recording (reproducing) of data is performed.

In the present embodiment, the traveling direction of the magnetic tape MT from the tape reel 21 to the reel 13 is indicated as "forward direction", and the traveling direction of the magnetic tape MT from the reel 13 to the tape reel 21 is indicated as "rearward direction". As can be seen in FIG. 2, the magnetic tape MT is guided to the head unit HU by guides 19a and 19b.

Head Unit Hu

The head unit HU performs the recording of data (data signal) on the magnetic tape MT and performs the reproducing of data (data signal) from the magnetic tape MT.

Figure 3A:
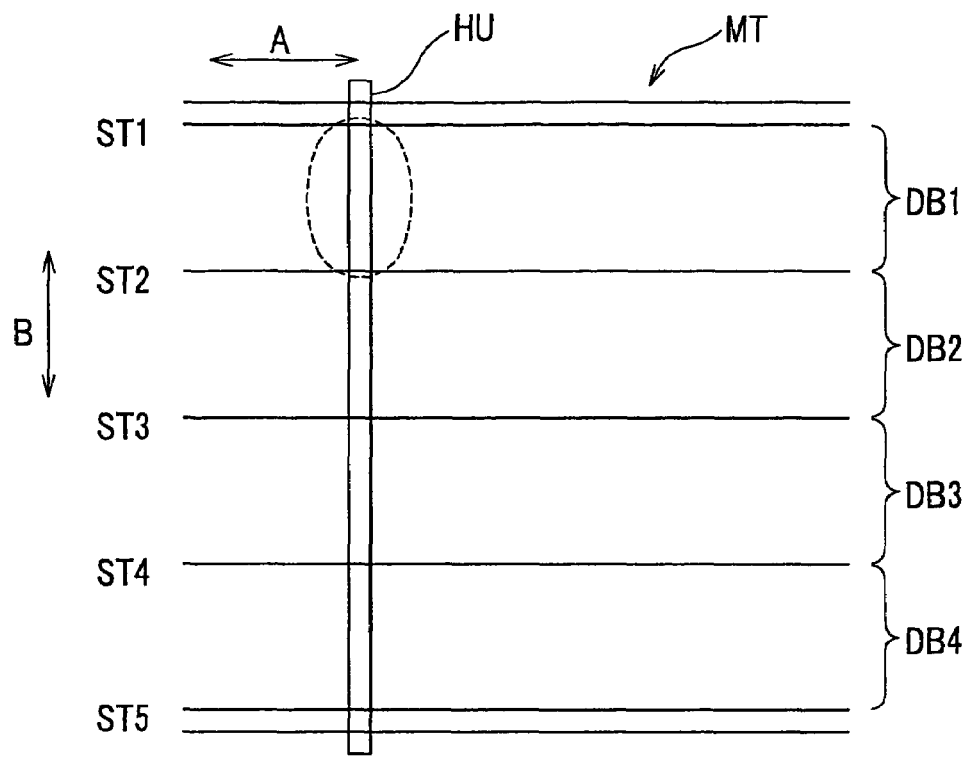
FIG. 3A is a plane view showing the head unit HU.
Figure 3B:
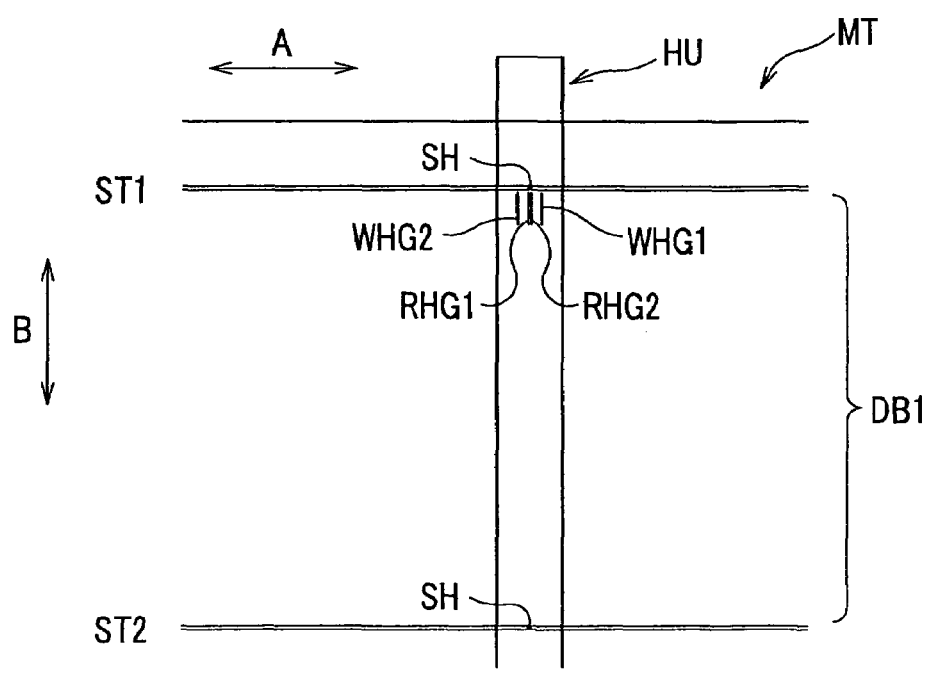
FIG. 3B is an enlarged plane view showing the part of the head unit HU enclosed in the circle shown by dot dash line of FIG. 3A.
Figure 4:
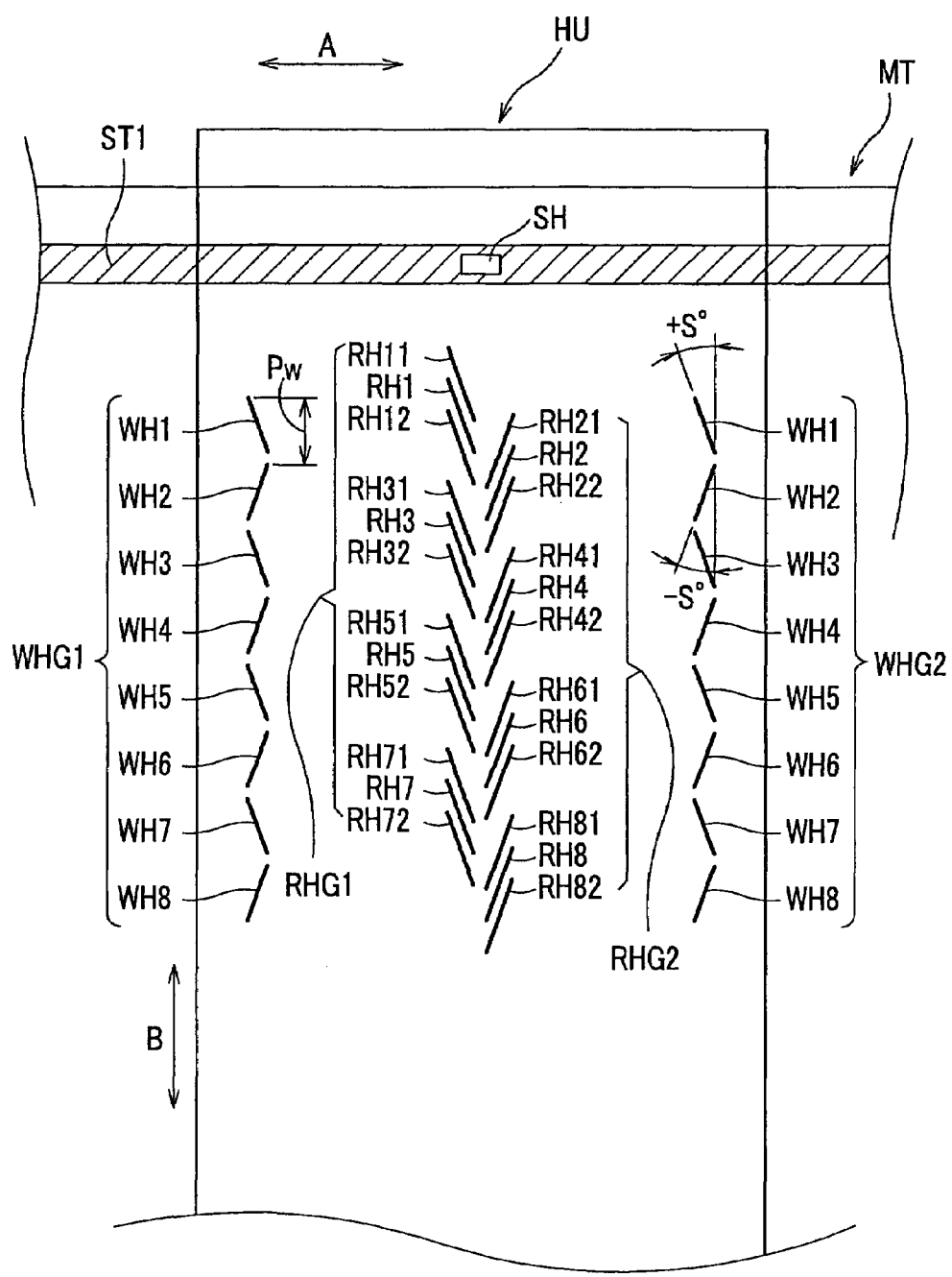
FIG. 4 is an enlarged plane view showing the region near the head of the head unit HU.

FIG. 3A is a plane view of the head unit HU. FIG. 3B is an enlarged view of the head unit HU, which is enclosed in the circle shown by the dot dash line in FIG. 3A. FIG. 4 is an enlarged view showing the region around the head of the head unit HU.

As shown in FIG. 3A, the width of the head unit HU is longer than that of the magnetic tape MT. The head unit HU is placed above the magnetic tape MT so that the magnetic tape MT falls within the width of the head unit HU and is appropriately shifted in the width directions B of the magnetic tape MT by the head unit driver 17 (FIG. 2), when the recording or the reproducing is performed.

As shown in FIG. 3B and FIG. 4, the head unit HU has data signal recording heads WH (WH1–WH8) and data signal reproducing heads RH (RH1–RH8). Here, the data signal recording head WH (hereinafter indicated as "recording head WH") is a head used for recording data (data signal) on the magnetic tape MT, and the data signal reproducing head RH (hereinafter indicated as "reproducing head RH") is a head to be used in order to obtain data (data signal) from the magnetic tape MT for performing the reproducing. Here, recording heads WH and reproducing heads RH are provided on the surface of the head unit HU so that those face the magnetic tape MT.

In the head unit HU, additionally, a plurality of servo signal readout heads SH (servo read head SH) that performs the readout of a servo signal from a servo track ST provided on the magnetic tape MT are provided.

Recording Head

As shown in FIG. 4, recording heads WH of the head unit HU are lined up in a line along the width directions B. Hereinafter, a group of recording heads WH are indicated as "recording head group WHG". In the present embodiment, the recording head group WHG is composed of a total of 8 recording heads WH1–WH8.

According to this recording head group WHG, a total of 8 data tracks DT can be simultaneously formed on the data band DB of the magnetic tape MT when the recording is performed. Hereinafter, the group of the data tracks DT, which are formed simultaneously were indicated as "data track group DTG" (see FIG. 6A). As can be thought from FIG. 5, a group of data tracks DT1–DT8 which are simultaneously formed along the traveling directions of the magnetic tape MT by the recording head group WHG1 is data track group DTG.

In the present embodiment, as can be seen in FIG. 4, an azimuth angle of the recording head WH changes by turns along the width directions B of the head unit HU. That is, each recording heads WH among the recording head group WHG is formed at different azimuth angle by turns.

In the present embodiment, the azimuth angle of each recording head WH (WH1–WH8) is set up at +S degrees or −S degrees so that the azimuth angle changes by turns. To be more precise, the azimuth angle of the recording head WH1 is +S degree, the azimuth angle of the recording head WH2 is −S degree, the azimuth angle of the recording head WH3 is +S degree, the azimuth angle of the recording head WH4 is +S degree . . . . That is, the recording heads having an azimuth angle +S degree are WH1, WH3, WH5, and WH7. The recording heads having an azimuth angle −S degree are WH2, WH4, WH6, and WH8.

Figure 5:
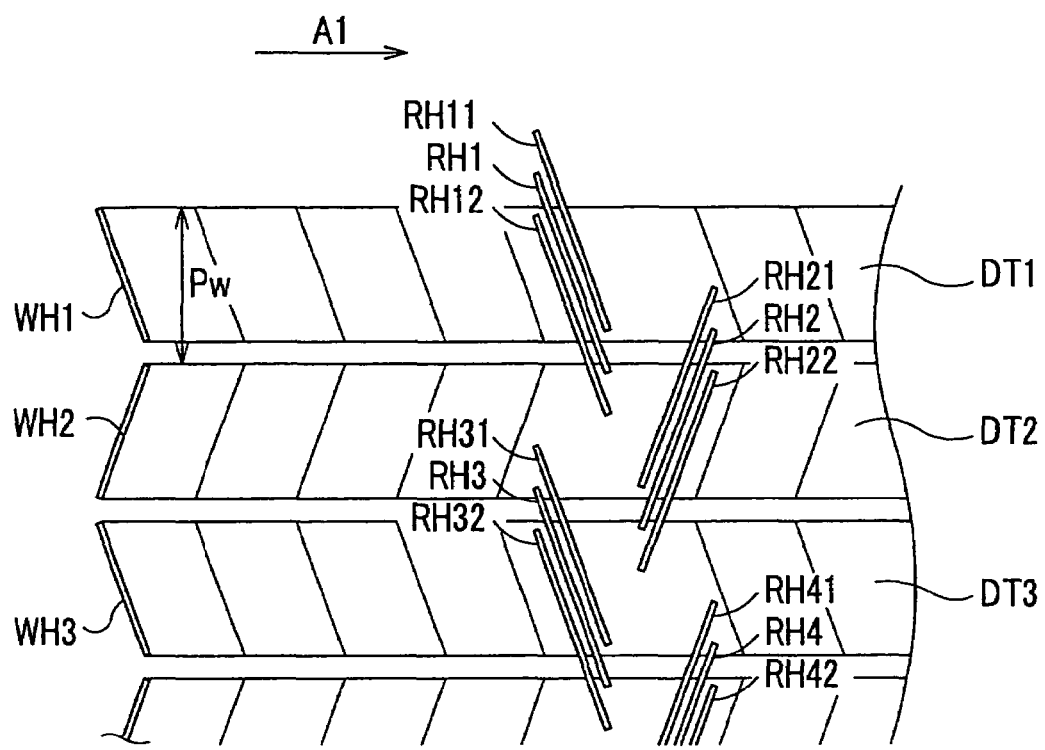
FIG. 5 is an explanatory view showing the tracking of each data tracks, which is formed by each recording head WH of the recording head group WHG, by each reproducing head RH.

In the present embodiment, as shown in FIG. 5, the distance Pw (pitch Pw) from one data track DT to next data track in the data track group DTG is the same distance as the distance from one recording head WH to next recording head WH of the recording head group WHG1. That is, the width of the data track DT is determined depending on the width of the recording head WH, and the interval between data tracks DT and DT is determined depending on the interval between recording heads WH and WH.

According to the head unit HU adopting the recording head group WHG, a wide margin space, which is provided in order to allow for error, such as a control error of the head unit HU, is not required between adjacent data tracks of the magnetic tape MT. Thus, the magnetic tape MT, in which data tracks are formed in more dense state than the conventional magnetic tape MT, can be provided. In other words, the magnetic tape MT, which has more data tracks along the width direction than the conventional magnetic tape, can be obtained.

Here, the accuracy of the pitch Pw is determined depending on the manufacturing accuracy of the interval of the recording head WH. Thus, the interval of the pitch Pw can be minimized so far as the manufacturing accuracy of the recording head WH allows. In other words, the length of the pitch Pw can be got closer to the width of the data track DT.

In the present embodiment, the azimuth angles of adjacent recording heads differ with each other. Thus, an adjacent data track DT is formed by a different azimuth angle. That is, since the azimuth angle of one recording head WH differs from that of next recording head WH, the azimuth angle of one data track DT differs from that of next data track DT.

Therefore, when performing the reproducing of data, each reproducing head RH can reproduce the prescribed data without reproducing the data held in the adjacent data track DT. This is because if the azimuth angle of the reproducing head RH disagrees with the azimuth angle of the data track DT, the reproducing head RH can not read data (signal data) from the data track DT.

Reproducing Head

As shown in FIG. 4, a group of reproducing heads RH (RH1–RH8) is composed of a first reproducing head group RHG1 and a second reproducing head group RHG2. The first reproducing head group RHG1 is composed of reproducing heads RH (RH1, RH3, RH5, RH7) whose azimuth angle is set to +S degree. The second reproducing head group RHG2 is composed of reproducing heads RH (RH2, RH4, RH6, RH8) whose azimuth angle is set to −S degree. The first reproducing head group RHG1 and the second reproducing head group RHG2 are lined up in two lines.

The position in the width directions with respect to the magnetic tape TM of the reproducing head RH1 is the same as that of the recording head WH1. In other words, reproducing heads are provided in a one-to-one relationship with corresponding recording heads. Additionally, the azimuth angle of the reproducing head RH1 is the same angle as that of the recording head WH1. Here, the azimuth angle is established at +S degree. In the present embodiment, the length of the reproducing head RH1 is about 1.5–2.0 times longer than that of the recording head WH1.

Additionally, spare reproducing heads RH11 and RH12 are provided at both sides with respect to the width directions of the magnetic tape MT of the reproducing head RH1, separately. Here, the length and azimuth angle of the spare reproducing heads RH11 and RH12 are the same as that of the reproducing head RH1.

Similarly, each positions in the width directions with respect to the magnetic tape TM of the reproducing heads RH3, RH5, and RH7 is the same position as that of the recording heads WH3, WH5, and WH7. In other words, the reproducing heads RH3, RH5, and RH7 are provided in a one-to-one relationship with the recording heads WH3, WH5, and WH7, respectively.

Additionally, the azimuth angle of each reproducing heads RH3, RH5, and RH7 is the same angle as that of each recording heads WH3, WH5, and WH7. Here, the azimuth angle is established at +S degree.

Additionally, the length of each reproducing heads RH3, RH5, and RH7 is longer than that of each recording heads WH3, WH5, and WH7, respectively. Each of the reproducing heads RH3, RH5, and RH7 also has spare reproducing heads at the both sides thereof, respectively.

In the second reproducing head group RHG2, the position in the width directions with respect to the magnetic tape TM of each reproducing heads RH2, RH4, RH6 and RH8 is the same position as that of each recording heads WH2, WH4, WH6, and WH8. Additionally, the azimuth angle of each reproducing heads RH2, RH4, RH6, and RH8 is the same angle as that of each recording heads WH2, WH4, WH6, and WH8. Here, the azimuth angle is established at –S degree.

Additionally, the length of each reproducing heads RH2, RH4, RH6 and RH8 is longer than that of each recording heads WH2, WH4, WH6 and WH8, respectively. Each of the reproducing heads RH2, RH4, RH6 and RH8 also has spare reproducing heads at both sides thereof, respectively. That is, the data signal reproducing head RH2 has spare reproducing heads RH21 and RH22 at both sides thereof. The data signal reproducing head RH4 has spare reproducing heads RH41 and RH42 at both sides thereof. The data signal reproducing head RH6 has spare reproducing heads RH61 and RH62 at both sides thereof. The data signal reproducing head RH8 has spare reproducing heads RH81 and RH82 at both sides thereof.

In the following explanation, a series of the reproducing heads RH1–RH8 and spare reproducing heads RH11–RH82 is also indicated as "a reproducing head RH".

According to the head unit HU adopting the reproducing head group RHG, the tracing of each data tracks DT of the data track group DTG is surely achieved by either of the reproducing head among the reproducing head group RHG. Thus, the reproducing of data (data signal) recorded on each data tracks DT of the data track group DTG can surely be performed.

In the present embodiment, additionally, only the data (data signal) obtained by the reproducing head RH that covers the entire data track DT in the width directions is used, when two or more reproducing heads are simultaneously located on the data track DT.

In other words, as shown in FIG. 5, the reproducing heads RH1, RH 11, and RH12 are above the data track DT. Among these reproducing heads RH1, RH 11, and RH12, only the reproducing head RH1 is surely on the data track DT. Thus, the data obtained from the reproducing head RH1 is used when performing the reproducing of data. Thereby, the tracing of the data track DT formed by the recording head WH1 is performed by the reproducing head RH1. Similarly, the tracing of each data tracks DT2, DT3 . . . is performed by each data signal reproducing heads RH2, RG3 . . . .

In the present embodiment, as described above, the length of the reproducing head RH1 is longer than the length of the data track DT. Thus, the reproducing of data is accurately performed as long as the data track DT is within the length of the reproducing head RH1, even if the position of the head unit HU is deviated in the width directions with respect to the magnetic tape MT.

In the present embodiment, as described above, spare reproducing heads RH11 and RH12 are provided at both sides of the reproducing head RH1. Thus, the reproducing of the data can be performed by using one of the spare heads RH11 and RH12, even if the position of the head unit HU is considerably deviated in the width directions with respect to the magnetic tape MT. In this case, the data obtained from the spare head just above the data track is adopted.

Additionally, if the data reproducing head RH is above the. wrong data track, since the azimuth angle of the data track DT1 differs from that of the data track DT2, the reproducing of the data on the wrong data track cannot be performed. Thus, the identification of the data track DT can be performed, and the miss load of the data never occurs.

As shown in FIG. 4, the recording head group WHG1 and WHG2 and the reproducing head group RHG1 and RHG2 are lined up in 4 lines along the longitudinal directions A of the magnetic tape MT. Here, the recording head group WHG1 and WHG2 and the reproducing head group RHG1 and RHG2 are lined up in order of: the recording head group WHG1, the reproducing head group RHG1, the reproducing head group RHG2, and the recording head group WHG2.

When the magnetic tape MT travels in the direction shown by arrow A1 (see FIG. 6A), the recording of data (data signal) is performed by the recording head group WHG1. When the magnetic tape MT travels in the direction shown by arrow A2 (see FIG. 6B), on the other hand, the recording of data (data signal) is performed by the recording head group WHG2.

In the present embodiment, reproducing head groups RHG1 and RHG2 are placed between recording head groups WHG1 and WHG2 in order to examine data (data signal) immediately after the recording by the recording head group WHG1 or WHG2. According to this arrangement, the examination of data (data signal) is surely performed even if traveling direction of the magnetic tape MT is reversed.

In the present embodiment, the recording head group WHG1 and WHG2 and the reproducing head group RHG1 and RHG2 may be lined up in order of: the reproducing head group RHG1, the reproducing head group RHG2, the recording head group WHG1, the reproducing head group RHG1, and the reproducing head group RHG2.

In the present embodiment, the recording head group WHG and the reproducing head group RHG are provided on the head unit HU so that the recording head group WHG and the reproducing head group RHG agree with the prescribed data band DB. This is because of performing the recording and reproducing of data (data signal) to the prescribed data track.

That is, in the present embodiment, 8 recording head group WHG and 8 reproducing head group RHG are arrayed on the head unit HU so that the position of each recording head groups and each reproducing head groups agree with the corresponding data band DB. To be more precise, the recording head group WHG1 and the reproducing head group RHG1 are provided on the head unit HU so that the recording head group WHG1 and the reproducing head group RHG1 agree with the data band DB1. Similarly, the position of the recording head group WHG2 and reproducing head group RHG2 agree with the data band DB2, the position of the recording head group WHG3 and reproducing head group RHG3 agree with the data band DB2, . . . , and the position of the recording head group WHG8 and reproducing head group RHG8 agree with the data band DB8.

Recording Current Generator 14

The recording current generator 14 supplies a recording current to each recording head WH of the head unit HU, when performing the recording of data. In this recording current generator 14, the recording current is generated based on a recording current control signal entered from the control unit 18, and is supplied to each recording head WH of the head unit HU.

Reproducing Signal Processor 15

The reproducing signal processor 15 converts each data signals obtained by each reproducing heads RH of the head unit HU into reproduced signals that can be handled in the control unit 18. Then, these reproduced signals are supplied to the control unit 18.

Servo Signal Processor 16

The servo signal processor 16 converts the servo signal obtained by the servo reading head SH of the head unit HU into the readout signal that can be handled in the control unit 18, when performing the reading or reproducing. Then, the readout signal is supplied to the control unit 18.

Head Unit Driver 17

The head unit driver 17 moves the head unit HU in the width directions with respect to the magnetic tape MT when performing the recording or reproducing. To be more precise, the head unit driver 17 moves the head unit HU in the width directions B with respect to the magnetic tape MT based on the head unit control signal entered from the control unit 18. Thereby, relative location between the recording head group WHG and data band DB and between the reproducing head group RHG and data band DB are controlled.

Control Unit 18

The control unit 18 controls the motion of each components of the magnetic tape drive 10.

The control unit 18 generates a recording current control signal based on the data entered from the computer (not shown) when performing the recording, and outputs the recording current control signal to the recording current generator 14.

Also, the control unit 18 converts the format of the reproduced signal, which is entered from the reproducing signal processor 15, into the suitable data format that can be handled in the computer, and then the control unit 18 supplies it to the computer.

The control unit 18 measures the positional error of the recording head group WHG (the reproducing head group RHG) of the head unit HU based on the readout signal entered from the servo signal processing circuit 16 when performing the recording (reproducing) of data. To be more precise, the control unit 18 measures the positional error with respect to the width directions B of the magnetic tape of the recording head unit group WHG of the head unit when performing the recording of the data. The control unit 18 measures the positional error with respect to the width directions B of the magnetic tape of the reproducing head unit group RHG of the head unit when performing the reproducing of the data.

Then, the control unit 18 generates the head unit control signal in order to correct the positional error of the recording head group WHG (reproducing head group RHG), and outputs the head unit control signal to the head unit driver 17.

Motion of the Head Unit

Next, the motion of the head unit HU of the magnetic tape drive 10, that is performed when performing the recording or reproducing, will be explained with reference to FIG. 6 and FIG. 7.

Figure 6A:
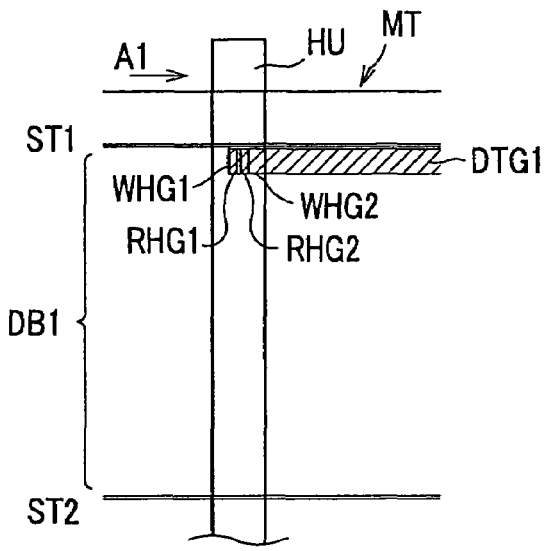
FIG. 6A is a plane view showing the condition wherein the recording (reproducing) of the data track group DTG1 is under going.
Figure 6B:
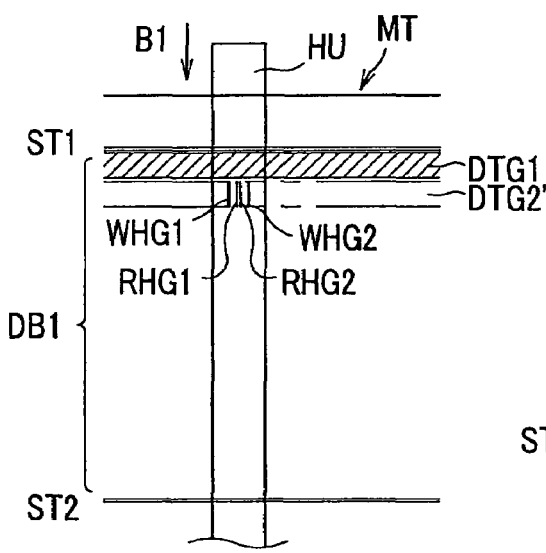
FIG. 6B is a plane view showing the condition wherein the recording (reproducing) of data track group DTG1 has been terminated.
Figure 6C:
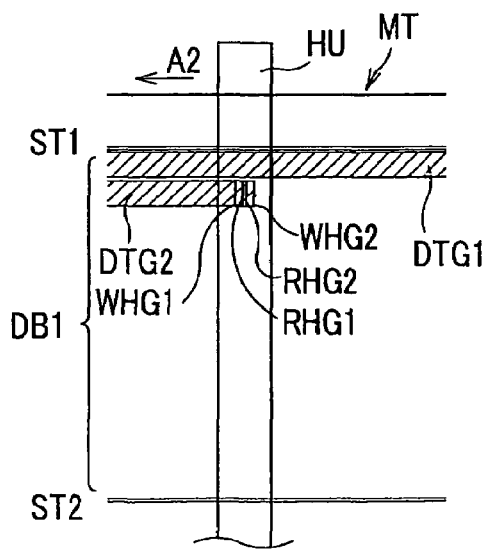
FIG. 6C is a plane view showing the condition wherein the recording (reproducing) of the data track group DTG2 is under going.

FIG. 6A is a plane view showing the condition wherein the recording (reproducing) of the data track group DTG1 is under going. FIG. 6B is a plane view showing the condition wherein the recording (reproducing) of data track group DTG1 has been terminated. FIG. 6C is a plane view showing the condition wherein the recording (reproducing) of the data track group DTG2 is under going.

Figure 7:
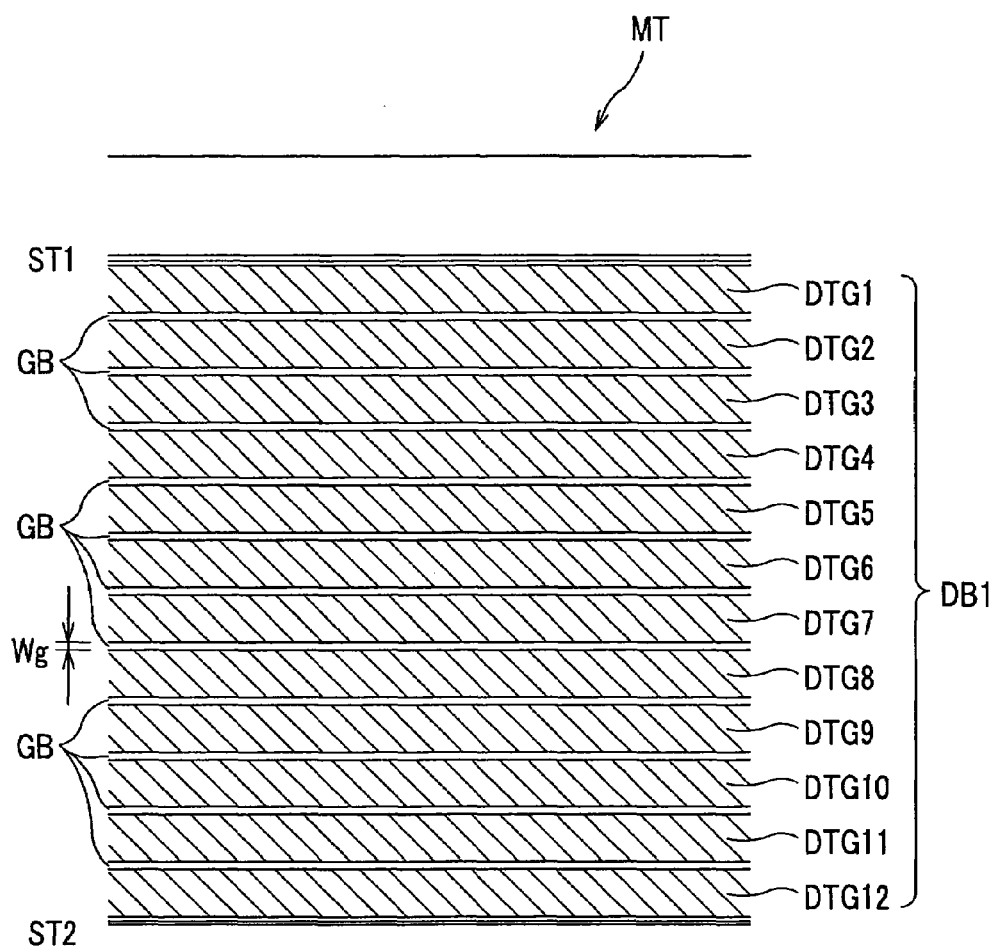
FIG. 7 is a plane view showing the magnetic tape MT wherein data track groups DTG1–DTG12 are formed on the data band DB1 by the head unit HU.

FIG. 7 is a plane view showing the magnetic tape MT wherein data track groups DTG1–DTG12 are formed on the data band DB1 by the head unit HU.

Recording

Firstly, the motion at the time of the recording will be explained.

The magnetic tape is moved in the forward direction (shown by arrow A1 in FIG. 6A) by the tape reel drive unit 11 and the reel drive unit 12, when performing the recording. In this occasion, the data track group DTG1 is formed on the data band DB1 by the recording head group WHG1 of the head unit HU. In the present embodiment, a total of 8 data tracks DT are formed by recording head group WHG1, simultaneously.

Then, the head unit driver 17 moves the head unit HU along the width direction B1 (see FIG. 6B) with respect to the magnetic tape MT, and places the recording head group WHG2 of the head unit HU on the prescribed position, from which the data track group DTG2 will be formed along the longitudinal directions of the magnetic tape MT.

In this occasion, the travel distance of the head unit HU is determined so that a guard band GB (see FIG. 7) having a predetermined width Wg is formed between adjacent data track groups DTG1 and DTG2. The width Wg of the guard band GB is established so that the influence caused by the control error of the position of the head unit HU can be eradicated. That is, this guard band GB serves as the margin for preventing the influence of the positional error in the width directions with respect to the head unit HU.

Then, the data track group DTG2 is formed by the recording head group WHG2 while moving the magnetic tape MT in the backward direction (shown by arrow A2 in FIG. 6C) using the tape reel driver 11 and reel driver 12.

By repeating these operations, a total of 96 data tracks are formed on the data band DB1. In the present embodiment, the magnetic tape MT is moved in the forward direction and backward direction 6 times, respectively, while changing the position of the head unit HU in the width directions with respect to the magnetic tape MT after each recording of data track DT is terminated. Thereby, a total of 12 data track group DTG1–DTG12 each of which includes 8 data tracks is formed by the recording head group WHG1 and WHG2. Here, the provision of the data track DT on each data bands DB2–DB4 is also performed by the same manner.

Reproducing

Next, the reproducing of data will be explained. Here, the reproducing of the data from the data tracks DTG that were formed by the recording head group WHG will be explained.

The magnetic tape is moved in the forward direction (shown by arrow A1 in FIG. 6A) by the tape reel drive unit 11 and the reel drive unit 12, when performing the reproducing. In this occasion, the reproducing of each data tracks DT of the data track group DTG1, which is formed on the data band DB1, is performed by reproducing head groups RHG1 and RHG2.

In this occasion, the tracing of each data tracks DT of the data track group DTG is surely performed by either of reproducing head RH of the reproducing head group RHG. Thus, the reproducing of the data (data signal) recorded on each data tracks is surely performed.

In the present embodiment, additionally, each azimuth angles of adjacent data tracks differ with each other. Thus, the distinction of whether the data obtained by the reproducing head RH is wrong data can be performed even if the reproducing head RH performs the readout of data on adjacent data track DT. Thereby, the reproducing of data with high S/N density can be achieved.

Then, the head unit driver 17 moves the head unit HU along the width direction B1 (see FIG. 6B) with respect to the magnetic tape MT, and places the reproducing head group RHG to the prescribed position, from which the readout of the data is started, in the data track group DTG2. Then, the reproducing of data from the data track group DTG2 is performed by the reproducing head group RHG while moving the magnetic tape MT in the backward direction (shown by arrow A2 in FIG. 6C) using the tape reel driver 11 and reel driver 12.

By repeating these operations, the reproducing of the data from the data track of each data track group DTG formed on the data band D1 can be performed.

In the present embodiment, a total of 12 data track group DTG1–DTG12 is formed on each data band DB. Thus, the magnetic tape MT is moved in the forward direction and backward direction 6 times, respectively, while changing the position of the head unit HU in the width directions with respect to the magnetic tape MT after each reproducing of data track DT is terminated.

Thereby, the reproducing of data on each data track group DTG1–DTG12 by the recording head group WHG1 can be performed. Here, the reproducing of data recorded on data track group DTG of each data bands DB2–DB4 is also performed by the same manner.

Although there have been disclosed what are the patent embodiment of the invention, it will be understood by person skilled in the art that variations and modifications may be made thereto without departing from the scope of the invention, which is indicated by the appended claims.

In the present embodiment, as described above, data recording heads WH are lined up in a line. But the arranging manner of recording heads WH is not limited to this.

Figure 8:
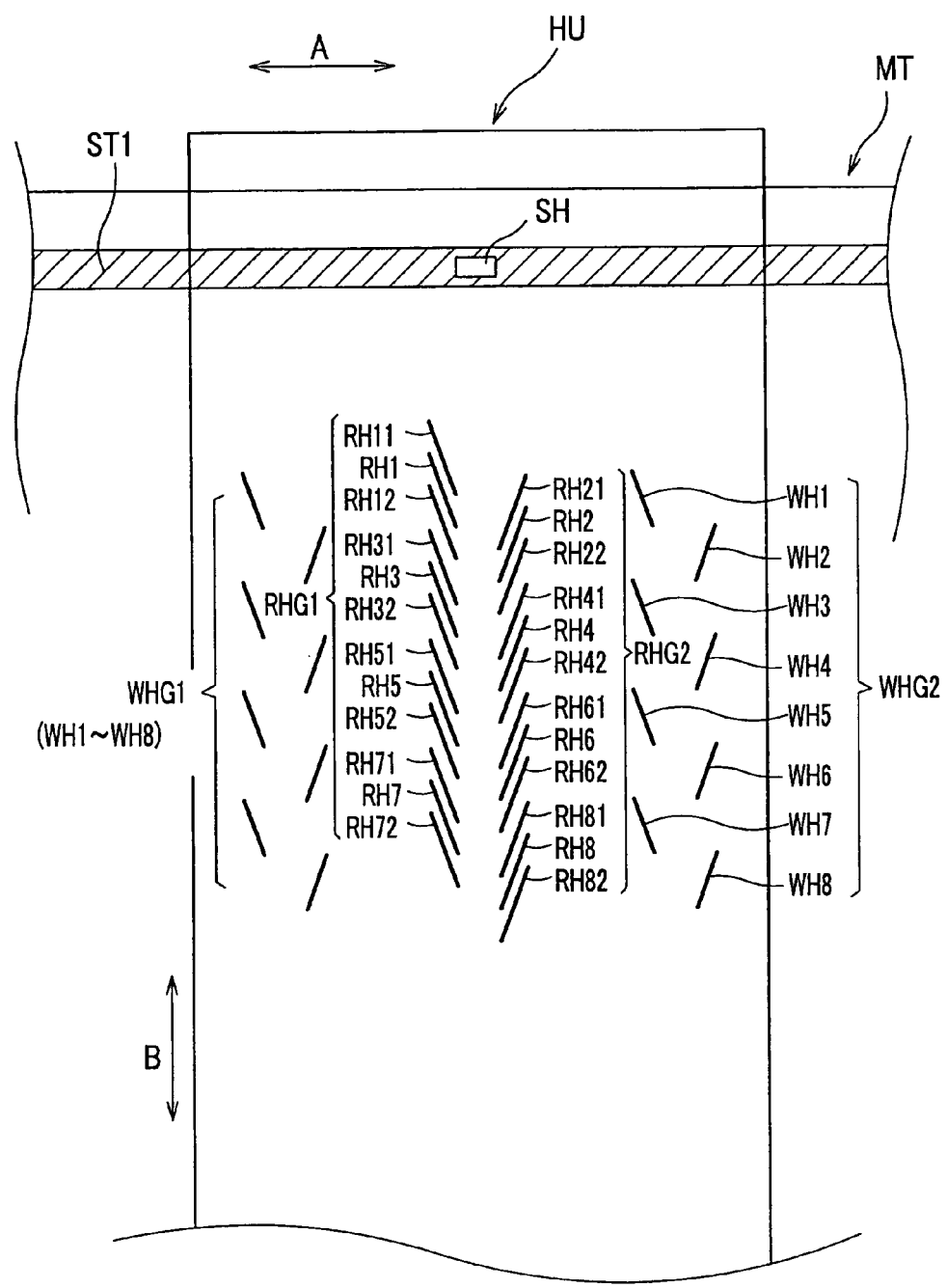
FIG. 8 is a plane view showing the head unit HU according to another embodiment of the present invention.

For example, these recording heads WH may be lined up in zigzag (see FIG. 8). To be more precise, the recording heads WH1, WH3, WH5, and WH7 are positioned at left side in FIG. 8, and the recording heads WH2, WH4, WH6, and WH8 are positioned at right side in FIG. 8. By displacing the position of each recording heads WH in the longitudinal directions A, the distance between data tracks can be set to almost zero. In this case, since distance between data tracks DT can be narrow, the number of data tracks can be increased.

Additionally, since adjacent data tracks are formed by the different azimuth angle, the distinction between adjacent data tracks can be performed even if the adjacent data tracks are overlapped with each other. Thereby, in the head unit HU, in which recording heads are provided in zigzag, the manufacturing accuracy of each head gap does not necessarily required. Thus, the design freedom is largely allowed.

In the present embodiment, the azimuth angle of the recording head WH changes by turns from +S degree to –S degree. But the degree of the azimuth angle is not limited to this. That is, any angle of azimuth angle may be adoptable as long as azimuth angles of adjacent recording heads WH differ with each other.

Therefore, the azimuth angle of each recording heads WH may be set at different angle, respectively. In this case, the recording and reproducing of data can be performed by making the azimuth angle of each reproducing heads to agree with that of corresponding recording heads WH.

In the present embodiment, the width Wg of the guard band GB is determined in consideration of the control error of the head unit HU. But the the width Wg of the guard band GB may be set to almost zero, when recording heads WH1–WH8 of the recording head group WHG are lined up in zigzag. This is because if the azimuth angles of adjacent data tracks differ with each other, the reproducing head can not reproduce the data band formed by the different azimuth angle. Thereby, the magnetic tape having data tracks in the high density can be obtained.

In the present embodiment, the recording head group WHG composed of a total of 8 data recordings head WH is adopted. But the recording head group can adopt any numbers of recording heads as long as two or more recording heads are provided on the recording head group.

In the present embodiment, each reproducing head RH1, RH2 . . . has spare reproducing heads at both sides there of. But the numbers of the spare reproducing heads are not limited to this. For example, any number of spare reproducing head can be adoptable.

What is claimed is:

1. A magnetic tape drive including a head unit, the head unit comprising:

a plurality of recording heads for recording data on a magnetic tape, the recording heads being aligned in a width direction of the magnetic tape, with adjacent recording heads having different azimuth angles;

a plurality of reproducing heads for performing a readout of data from the magnetic tape, each reproducing head being disposed downstream in a tape travel direction of a corresponding recording head and having the same azimuth angle as the azimuth angle of the corresponding recording head; and a servo head for performing a readout of a servo signal recorded on the magnetic tape for a tracking control of the head unit, wherein the head unit further comprises sub-reproducing heads disposed on both sides of each reproducing head in the width direction of the magnetic tape, and the lengths and azimuth angles of the sub-reproducing heads are the same as the lengths and azimuth angles of the respective reproducing heads.

2. The magnetic tape drive according to claim 1, wherein each reproducing head is longer in the width direction than the corresponding recording head.

3. The magnetic tape drive according to claim 2, wherein only data obtained by a reproducing head or a sub-reproducing head that covers the entire data track in the width direction is used, when two or more of the reproducing head and the sub-reproducing heads are simultaneously located on the data track.

4. The magnetic tape drive according to claim 3, wherein the azimuth angles of the adjacent recording heads are established at predetermined different angles whose absolute values are the same value.

5. The magnetic tape drive according to claim 2, wherein the azimuth angles of the adjacent recording heads are established at predetermined different angles whose absolute values are the same value.

6. The magnetic tape drive according to claim 2, wherein the azimuth angles of the recording heads differ with each other.

7. The magnetic tape drive according to claim 2, wherein the reproducing heads are 1.5 to 2.0 times longer than the recording heads.

8. The magnetic tape drive according to claim 1, wherein only data obtained by a reproducing head or a sub-reproducing head that covers the entire data track in the width direction is used, when two or more of the reproducing head and the sub-reproducing heads are simultaneously located on the data track.

9. The magnetic tape drive according to claim 8, wherein the azimuth angles of the adjacent recording heads are established at predetermined different angles whose absolute values are the same value.

10. The magnetic tape drive according to claim 8, wherein the azimuth angles of the recording heads differ with each other.

11. The magnetic tape drive according to claim 1, wherein the azimuth angles of the adjacent recording heads are established at predetermined different angles whose absolute values are the same value.

12. The magnetic tape drive according to claim 1, wherein the azimuth angles of the recording heads differ with each other.

13. The magnetic tape drive according to claim 1, wherein a distance between adjacent data tracks is approximately zero.

14. A magnetic tape drive including a head unit, the head unit comprising:
- a first set of a plurality of recording heads for recording data on a magnetic tape, the recording heads being aligned in a width direction of the magnetic tape, with adjacent recording heads having different azimuth angles;
- a second set of a plurality of recording heads for recording data on the magnetic tape, the recording heads being aligned in the width direction of the magnetic tape, and each recording head being aligned in a tape travel direction with a corresponding recording head of the first set and having the same azimuth angle as the azimuth angle of the corresponding recording head of the first set;
- a plurality of reproducing heads for performing a readout of data from the magnetic tape, each reproducing head being disposed between a corresponding recording head of the first set and a corresponding recording head of the second set and having the same azimuth angle as the azimuth angle of the corresponding recording heads; and
- a servo head for performing a readout of a servo signal recorded on the magnetic tape for a tracking control of the head unit,
- the head unit further comprising sub-reproducing heads disposed on both sides of each reproducing head in the width direction of the magnetic tape, and the lengths and azimuth angles of the sub-reproducing heads are the same as the lengths and azimuth angles of the respective reproducing head.

* * * * *